Jan. 29, 1924.

J. WHITING 1,481,971

METHOD OF AND MEANS FOR CONTROLLING THE HUMIDITY WITHIN CONTAINERS

Filed May 17, 1921

Inventor
Jasper Whiting
By Byrnes Townsend & Brickenstein
Attorneys

Patented Jan. 29, 1924.

1,481,971

UNITED STATES PATENT OFFICE.

JASPER WHITING, OF BOSTON, MASSACHUSETTS.

METHOD OF AND MEANS FOR CONTROLLING THE HUMIDITY WITHIN CONTAINERS.

Application filed May 17, 1921. Serial No. 470,305.

*To all whom it may concern:*

Be it known that I, JASPER WHITING, a citizen of the United States, residing at Boston, in the county of Suffolk and State of Massachusetts, have invented certain new and useful Improvements in Methods of and Means for Controlling the Humidity Within Containers, of which the following is a specification.

This invention relates to the control of the humidity within containers.

The quality of various materials, such as cigars, tobacco, foodstuffs and various other absorbent materials depends to a considerable extent upon the degree of humidity of the atmosphere surrounding the material.

A cigar which is too dry burns too rapidly and does not develop that peculiar aroma which is desired by fastidious smokers. On the other hand, if kept too moist it tends to develop mold. Likewise bread, cake and various other food products if too dry or too moist are not considered as palatable as the same products with a definite moisture content between the extremes.

During the course of their manufacture, certain materials such as tea and tobacco, require to be maintained at a definite moisture content if satisfactory results are to be obtained, as is well known. Briefly the physical condition of many absorbent substances is dependent upon their moisture content, which in turn depends mainly on the humidity of the air which surrounds them.

I am aware that various devices have been used for maintaining substantially dry air in closed containers, or for maintaining the air within a container at substantially 100% relative humidity.

Many materials, however, function best at some definite degree of humidity intermediate between complete saturation and complete dryness; and by my invention I aim to maintain the material at such a definite degree of humidity.

It is the object of my invention to maintain within a closed container a fairly constant relative humidity or moisture content, even though articles which are much wetter or dryer than corresponds to the desired moisture content are placed from time to time within the box.

This may be accomplished in an imperfect manner by placing within the container a solution of some soluble material. If the concentration of the solution is properly adjusted, it will take up water from articles which are too wet or give it off to articles which are too dry. The difficulty is, however, that the vapor pressure of such solution changes, as it takes up or gives off water, and so the vapor pressure which is maintained within the container will not be constant, and the solution will have to be changed quite frequently, if even approximate constancy is to be maintained.

These difficulties and inconveniences may be largely overcome by placing in the container a saturated solution of a salt in contact with a quantity of the salt in solid form. When this system takes up water the amount of the solution phase is merely increased and the amount of the solid phase correspondingly decreased, but the concentration of the solution, and consequently the vapor pressure, remains unchanged until one or the other of the two phases disappears. The use of such a system permits the use of a relatively small quantity of solution and the maintenance of a substantially constant vapor tension with less frequent readjustment of the system.

The use of solutions or finely divided solids is, moreover, open to certain mechanical and practical difficulties and disadvantages which render them unsuitable to commercial use. Thus solutions within containers are likely to contaminate the articles contained by being overturned, by accident or otherwise. Besides, the use of a solution in such container is a slow method of accomplishing the purpose since the amount of surface exposed to the air is relatively small and therefore, the rate of absorption or evaporation of moisture is correspondingly low.

It is a more particular object of the invention to provide a method of and means for maintaining a relatively high humidity in a container without the disadvantages above pointed out. And this object I attain by the use of a saturated solution of a salt containing an excess of the salt in solid phase.

The nature of the invention will be more fully explained in the specification and more particularly pointed out in the claims.

In the drawings which form a part of the specification—

Figure 1:
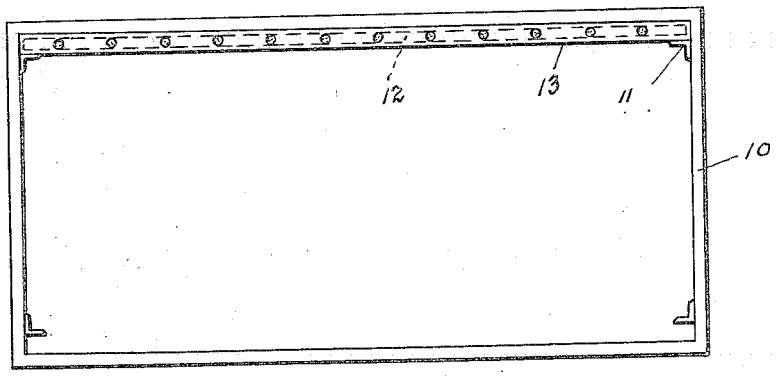
Fig. 1 is a plan view of a container to which the invention is applied, the cover being removed.
Figure 2:
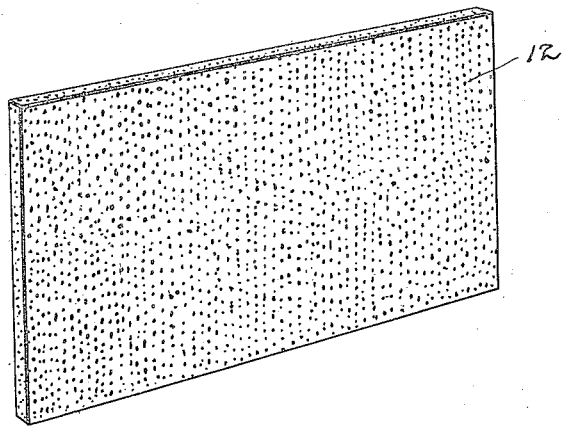
Fig. 2 is a perspective view of a porous carrier.
Figure 3:
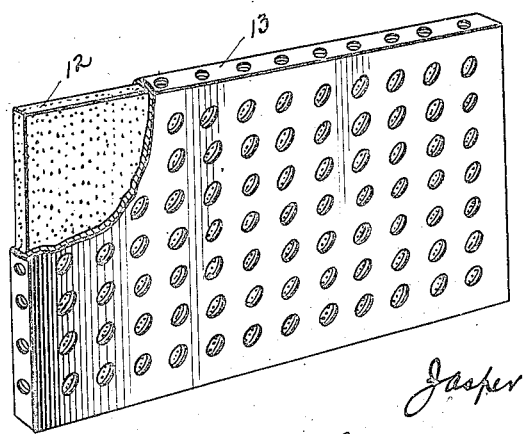
Fig. 3 is a perspective view of the device shown in Fig. 2 as used in practice.

In Fig. 1 the box 10 is chosen to represent generally a container for absorbent material such as above referred to. Adjacent one side wall is secured by cleats 11 a slab 12.

The slab 12 is made of porous material. So far as the general purpose of the invention is concerned, any chemically inert porous material may be used. In practice, however, I prefer a solid body of porous material for reasons to be more fully explained. The slab 12 or any other porous solid body has the purpose to receive a solution of a salt within its pores, the solution being held therein by capillary attraction. The solution, the function of which has been pointed out above, is applied in such quantity as regards the percentage of voids in the mass that it will always be so held even when a considerable quantity of water has been absorbed. In other words, the solution is of such consistency that it is capable of taking up more water and the quantity is so proportioned relatively to the holding capacity of the body that such additional water can be safely held by capillary attraction.

The solution may frequently be more conveniently introduced by using a solution of a concentration and at a temperature such that on cooling it would deposit the excess solid salt in the desired proportions, thus producing a saturated solution containing some of the solid salt.

The salt solution and the quantity thereof is, of course chosen with respect to a desired degree of relative humidity which may be different for different materials to be protected. Thus for tobacco a relative humidity of 50% to 65% is most desirable while cake and bread require a humidity of from 80% to 95%.

A salt solution to be applicable for cigars or tobacco for instance must be such that it absorbs water when the humidity rises above some equilibrium point between 50 and 65% and gives off water when the humidity falls below this point.

Thus the system $K_2CO_3 1.5H_2O+$ saturated solution has a humidity equilibrium point (at all ordinary indoor temperatures) about midway within this range, while the system KCNS saturated solution gives a value near the lower limit of this range.

Experiment has shown, for example, that a system containing a saturated solution of potassium carbonate and some of the salt in solid phase, will maintain a practically uniform relative humidity of 57%, while absorbing water between the limits of two tenths to nine tenths of the weight of the anhydrous salt, or while giving up water between these same limits.

There is thus a wide range during which the humidity may remain unchanged or in equilibrium condition.

The selection of the particular salt best suited for a particular material is a matter with which experts are fully acquainted and need not be described in detail.

As previously stated, while generally any porous body may be used as a carrier of the solution, I prefer in practice a porous solid body because it has greater retentive capacity, is mechanically more desirable and more convenient for handling. I prefer a material which is not seriously affected by reasonably high temperatures and which does not tend to crumble by slight abrasions or otherwise. Materials which fulfill these requirements are any one of the many forms of clay and asbestos products, electric furnace or natural filtering materials, etc.

This porous material may be applied in any form. It is preferably used in the shape of slabs, as indicated in the drawings, and arranged that a slab may be easily removed from the container for the proper readjustment of its moisture content.

These slabs are preferably encased in a perforated cover 13 made of metal or other material to keep them out of contact with the material contained.

As above referred to, the form and application of the invention shown in the drawing is merely generally representative. It is not necessary to refer particularly to other embodiments, different applications, different containers or different arrangements of the porous body in the container. The invention proper is not materially affected by such differences and modifications.

In whatever form the invention may be embodied, it is based upon the fact that the material reacting upon the moisture content of the atmosphere when distributed amongst the pores of a porous body and in particular of a porous solid body, presents a considerably larger surface to the atmosphere than when contained in any other way. Each pore is so to speak a minute container in itself which has the practical advantage that it will hold its content in all positions. Due to the large effective surface of the reacting material the device is quickly responsive to changes in the moisture content of the surrounding atmosphere.

I am aware that it has been proposed to use partially dehydrated salts in solid form (see U. S. Patent No. 949,701), which are in effect a mixture of hydrated and anhydrous salts.

I claim:

1. The method of maintaining a substantially constant relative humidity in a gas, which consists in bringing in contact with the gas a saturated solution of a salt containing an excess of the salt.

2. The method of maintaining a substantially constant relative humidity in a gas, which consists in bringing in contact with the gas a salt contained in the pores of a porous solid body partly as a solid and partly in saturated solution.

3. A device for maintaining a substantially constant relative humidity in a gas, comprising a porous body holding within its pores a salt partly as a solid and partly in saturated solution.

In testimony whereof, I affix my signature.

JASPER WHITING.